(12) United States Patent
Dimanstein

(10) Patent No.: US 6,437,524 B1
(45) Date of Patent: Aug. 20, 2002

(54) FREQUENCY CONTROL OF LINEAR MOTORS

(75) Inventor: Isaac Dimanstein, Carrara (AU)

(73) Assignee: Airxcel, Inc., Wichita, KS (US)

( * ) Notice: Subject to any disclaimer, the term of this patent is extended or adjusted under 35 U.S.C. 154(b) by 0 days.

(21) Appl. No.: 09/787,243

(22) PCT Filed: Sep. 16, 1999

(86) PCT No.: PCT/AU99/00783
§ 371 (c)(1),
(2), (4) Date: Jul. 2, 2001

(87) PCT Pub. No.: WO00/16482
PCT Pub. Date: Mar. 23, 2000

(30) Foreign Application Priority Data

Sep. 16, 1998 (AU) .............................................. PP 5935
Nov. 13, 1998 (AU) .............................................. PP 7120

(51) Int. Cl.$^7$ ........................ H03K 17/68; H02K 33/00
(52) U.S. Cl. ........................................ 318/135; 318/119
(58) Field of Search ................................ 318/135, 119, 318/122, 126, 127, 128; 310/12, 15, 17, 21

(56) References Cited

U.S. PATENT DOCUMENTS

| | | | | | |
|---|---|---|---|---|---|
| 3,676,758 A | * | 7/1972 | Mathews | ...................... | 310/27 |
| 4,309,675 A | * | 1/1982 | Rabe | .......................... | 318/127 |
| 4,404,671 A | * | 9/1983 | Kuribayashi et al. | ........ | 318/687 |
| 4,772,838 A | * | 9/1988 | Maresca | ...................... | 310/27 |
| 4,965,864 A | * | 10/1990 | Roth et al. | .................... | 310/12 |
| 5,032,772 A | * | 7/1991 | Gully et al. | ................. | 318/132 |

* cited by examiner

Primary Examiner—Burton S. Mullins
(74) Attorney, Agent, or Firm—Shook, Hardy & Bacon L.L.P.

(57) ABSTRACT

An electrical driver (10) for a linear electrical motor which drives a linear refrigerant compressor (11) that has a resonant frequency includes a sensor (22) for measuring the magnitude and polarity of the back EMF of the electrical motor at the beginning and/or end of the stroke of the compressor (11). A control circuit (12) analyses the measured back EMF to determine whether the driver frequency is higher or lower than the frequency of the compressor (11) and then adjusts the frequency of the driver (10) to or closer to the resonant frequency of the compressor (11).

8 Claims, 4 Drawing Sheets

FREQUENCY CONTROL OF LINEAR MOTORS

TECHNICAL FIELD

This invention relates to linear electrical motors and more particularly to the frequency control of a linear electrical motor of a linear refrigerant compressor.

BACKGROUND ART

In simplistic terms, a linear refrigerant compressor includes an armature mounted between two springs which drives the piston of a refrigerant compressor. The armature is driven backwards and forwards by an electrical driver alternately compressing one or other of the springs.

There is a natural resonant frequency of such linear compressors which is a function of the mass of the armature and the tension of the springs. Because the piston is attached to the armature, the resonant frequency will be affected by the load that is applied to the piston. In most applications, this load is not constant and therefore the resonant frequency of the compressor will not be constant.

To achieve high efficiency, the linear motor should be driven at the resonant frequency of the compressor that is to say, the driver frequency should be as close as possible to the resonant frequency of the linear motor compressor.

There are different prior art methods which attempt to synchronise the driver frequency to the resonant frequency of the compressor. One prior art method measures the pressures on the high pressure side and the low pressure side of the compressor and the driver frequency is adjusted according to these pressure measurements. This method has the disadvantage of not taking into account inherent variations in the initial resonant frequency of linear motor compressors that arise through manufacturing processors.

Another prior art method which attempts to synchronise the driver frequency to the resonant frequency sensors the current wave form and adjusts the driver frequency according to the sensed wave form. The disadvantage of this method is that the relationship between the current wave form and the movement of the armature is not constant for all operating conditions of the compressor.

Australian Patent No 687,294 describes a linear refrigerant compressor having a one-sided armature driver. Back EMF generated by the armature is used to adjust the frequency of the electrical driver. This is achieved by applying power to the compressor when the back EMF is zero which can be measured after no power is applied to the downward cycle of the compressor (i.e. the compressor is powered only on the upward stroke). This prior art system has several disadvantages. For example, the ripple current on the compressor and driver is very high as twice as much current is applied on the upward stroke compared to a double-sided driver. Furthermore, compressor efficiency cannot be maximised as power is applied only in one direction and because the on time to the compressor is constant and the frequency adjusted, the efficiency cannot be maximised over the whole range of working conditions.

DISCLOSURE OF INVENTION

It is an object of this invention to provide a method of driving a linear motor compressor at a frequency that will be as close as to the resonant frequency of the compressor by measuring the back EMF generated by the armature of the motor.

Linear electrical motors, as do any other electric motor, produce back EMF proportional to the speed of armature movement. At both ends of the stroke, the armature speed is zero so that the back EMF produced by the linear motor is also zero at both ends of the stroke.

As zero EMF occurs at the point where the direction of movement of the armature is reversed—that is at the beginning of a new cycle or half cycle of the driver waveform, the frequency of the electrical driver can be adjusted so that the change of direction of armature movement will be at the same time as the change of the driving wave from one polarity to the other.

According to one aspect of the invention there is provided a method of controlling the frequency of a driver circuit of a linear electrical motor which drives a linear refrigerant compressor that has a characteristic resonant frequency, said method comprising the steps of measuring the magnitude and polarity of the back EMF at either the start or the end of the stroke of the compressor, analysing the measured back EMF to determine whether the driver frequency is higher or lower than the resonant frequency of the compressor, and adjusting the frequency of the driver to or closer to the resonant frequency of the compressor.

According to another aspect of the invention there is provided a method of operating the driver circuit of a linear electrical motor which drives a linear refrigerant compressor that has a characteristic resonant frequency, said method comprising monitoring the polarity of the back EMF at either the start or the end of the stroke of the compressor, analysing the monitored back EMF and adjusting the frequency of the driver to or closer to the resonant frequency of the compressor.

According to a further aspect of the invention there is provided a control circuit for a linear electrical motor which drives a linear refrigerant compressor that has a resonant frequency, said control circuit comprising means for measuring the magnitude and polarity of the back EMF of the electrical motor at the beginning and/or end of the stroke of the compressor, means for analysing the measured back EMF to determine whether the driver frequency is higher or lower than the resonant frequency of the compressor and means for adjusting the frequency of the driver to or closer to the resonant frequency of the compressor.

BEST MODE FOR CARRYING OUT THE INVENTION

Figure 1:
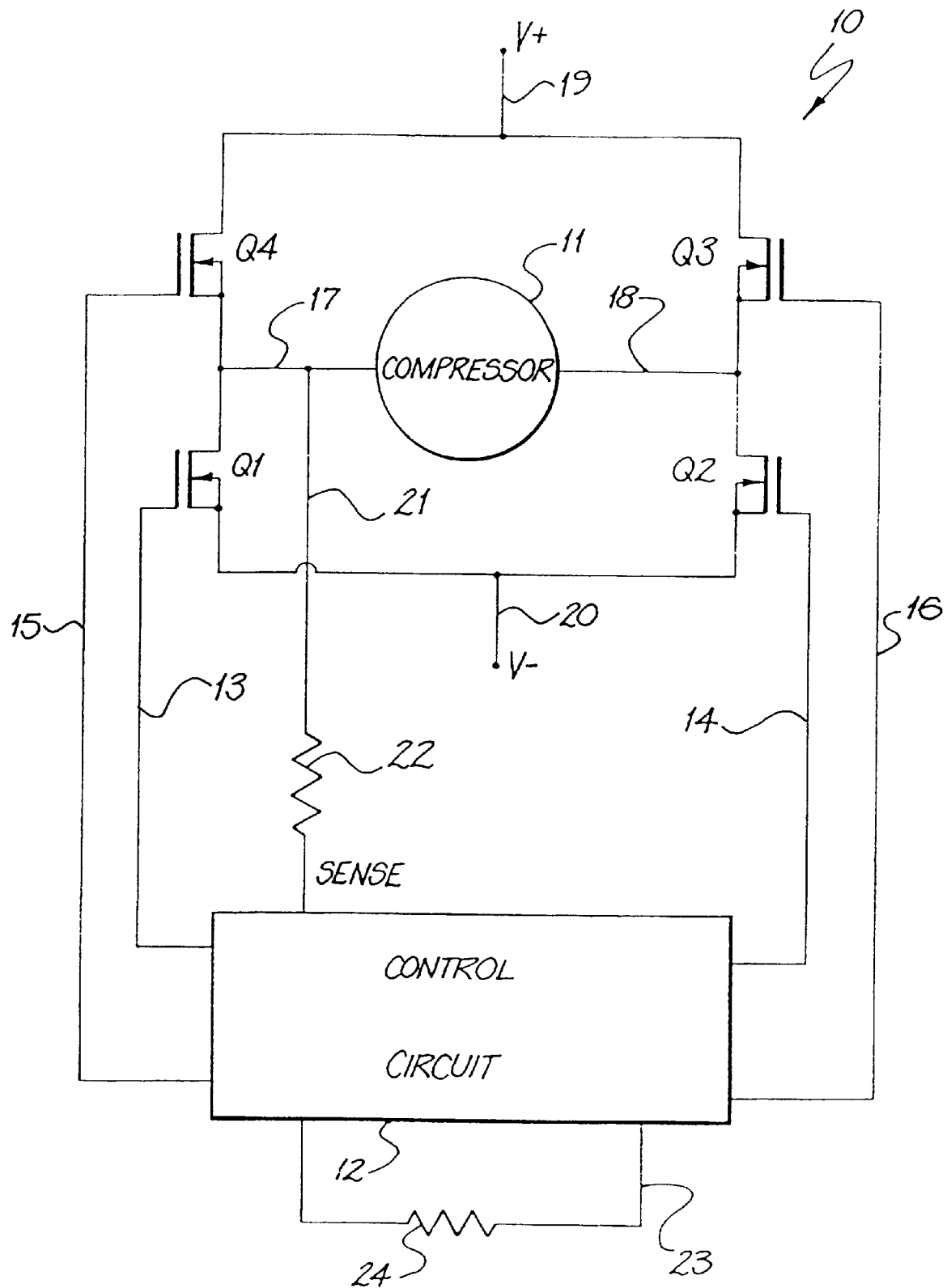
FIG. 1 is schematic diagram of an electrical driver for a linear motor compressor according to one embodiment of the invention.

The electrical driver 10 shown in FIG. 1 includes four MOSFETs Q1, Q2, Q3 and Q4 which deliver power to the electrical motor of the linear refrigerant compressor 11. The MOSFETs Q1, Q2, Q3 and Q4 are controlled by a control circuit 12 via lines 13, 14, 15 and 16 respectively. In this instance, a microcontroller is used as a main block of the control circuit 12. The microcontroller has an analogue-to-digital (A/D) converter which can sense analogue voltage and convert the sensed analogue voltage to digital data that can be processed by the microcontroller.

Power is supplied to the driver 10 by positive input line 19 and negative input line 20. Line 21 connected between line 17 and the control circuit 12 includes a sensing resistor 22.

Figure 2:
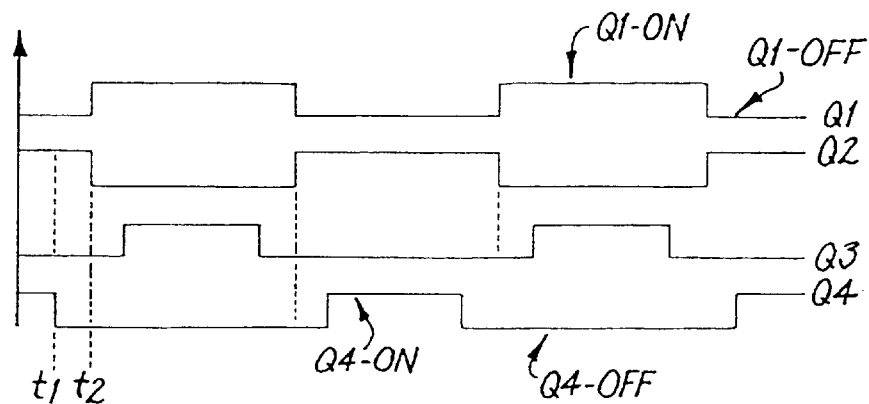
FIG. 2 is a graph of the drive signals to each of the four MOSFETs Q1, Q2, Q3 and Q4 of the electrical driver shown in FIG. 1.

The MOSFETs Q1, Q2, Q3 and Q4 are switched on and off in the sequence represented in FIG. 2 at a frequency controlled by the control circuit 12. A high signal in FIG. 2 represents a MOSFET conducting (i.e. on) and a low signal in FIG. 2 represents a MOSFET not conducting (i.e. off). The power to the motor of the compressor 11 is delivered from the input positive line 19 and negative line 20 via two pairs of MOSFETs—Q4 and Q2 in one direction and Q3 and Q1 in the other direction.

The ON time of the compressor 11 is varied according to change in working conditions such as ambient temperature changes. The ON time may vary between 35% and 75% of the cycle. A thermistor 24 in line 23 is used to determine, say, the temperature of the condenser of the refrigeration system. The line 23 applies the voltage drop across the thermistor (which is a measure of condenser temperature) to the control circuit 12 where it is converted to a digital signal and fed to a look-up table within the software of the control circuit to determine the appropriate ON time for the system given that particular condenser temperature and pre-determined operating parameters for the refrigeration system. For example, if the resonant frequency of the compressor is 50 Hz, the duty cycle will be 20 milliseconds and the ON time could be 12 milliseconds with the OFF time being 8 milliseconds. The thermistor 24 could be a resistor, potentiometer or any other variable sensor that measures a change in working conditions.

The operation of the driver will be first described with the driver frequency being adjusted by sensing the back EMF at the end of a stroke. Just before time $t_1$ the MOSFETs Q2 and Q4 are conducting to deliver positive potential to line 17 and negative potential to line 18. The current flows from positive input line 19 via Q4 through line 17 to the compressor 11 and then line 18 via Q2 to the negative input line 20.

Figure 6:
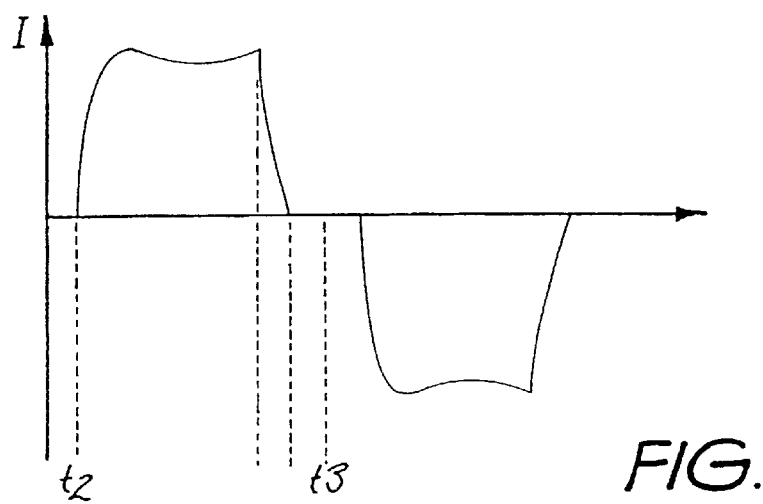
FIG. 6 is a graph of driver current for the driver of the present invention.

At time $t_1$ the current in the driver is at or near its maximum as shown in FIG. 6. At time $t_1$, Q4 is switched off but Q2 remains on. Because of the inductance of the compressor 11 and the inertia associated with the inductance of the compressor, the current will continue to flow in the same direction but will decrease as is shown in FIG. 6. Current flow will be from the compressor 11 to MOSFET Q2 (which is still on) and via the internal body diode of Q1 back to the compressor 11. As shown in FIG. 6, this current will gradually drop until all the energy that had been stored in the inductance of the compressor 11 will be dissipated in the compressor winding and the resistance of MOSFETs Q1 and Q2.

Figure 5:
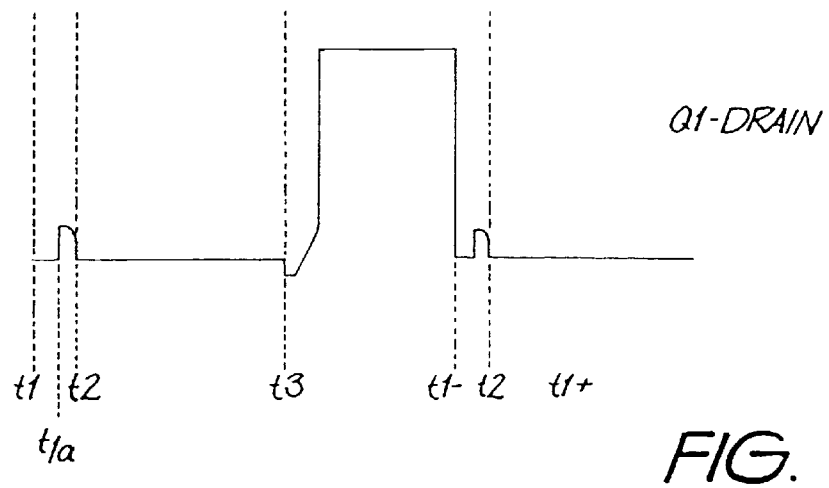
FIG. 5 is a graph of the drain voltage of MOSFET Q1 of the electrical driver shown in FIG. 1 when the driver frequency is higher than the resonant frequency of the linear compressor.

After all the energy has been dissipated, the current drops to zero (at time $t_{1a}$). From time $t_{1a}$ to time $t_2$, the only voltage on the terminals of the compressor 11 will be the result of the back EMF (i.e. from armature movement). If the compressor resonant frequency is lower than the driver frequency in the time period $t_{1a}$ to $t_2$, the armature will be continuing to move in the same direction as before $t_1$. This means that the back EMF produced by the armature will be in the same polarity as the voltage applied before $t_1$—that is the drain of MOSFET Q1 or the voltage on line 17 will be positive as shown in FIG. 5.

As the armature slows down, this voltage will drop towards zero and will be zero when the armature stops. In the case that the compressor frequency is lower than the driver frequency this will happen after $t_2$ so that the voltage will be positive. In the case that the compressor frequency is higher than the driver frequency, this will happen before $t_2$ so that at $t_2$ the voltage on line 17 will be negative.

The voltage on line 17 is fed to the A/D converter of the microcontroller via resistor 22. The A/D converter converts this voltage to a digital signal that is fed to the microcontroller of the control circuit 12. The microcontroller examines this signal and if it is positive at time $t_2$, it reduces the frequency of the driver. If the digital signal is negative at time $t_2$, the microcontroller increases the frequency of the driver. In both cases, the microcontroller changes the frequency of the driver so that at time $t_2$ the signal (which represents the back EMF) will be as close as possible to zero ensuring that the driver frequency is close to the resonant frequency of the compressor.

Figure 7:
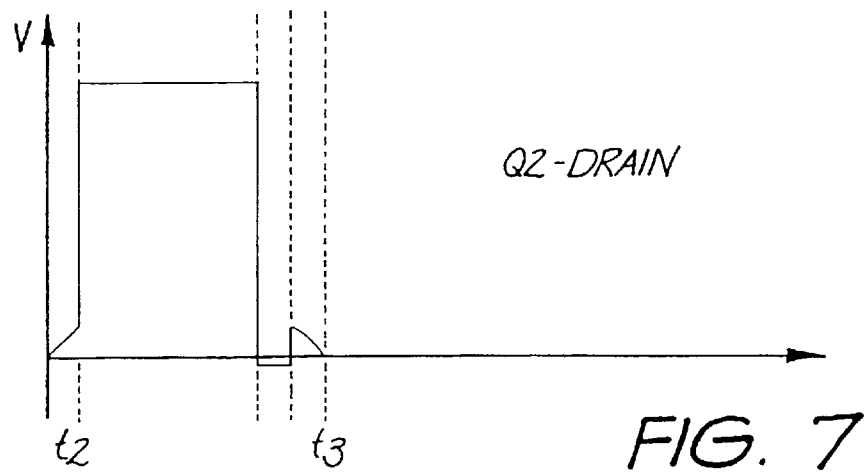
FIG. 7 is a graph of the drain voltage of MOSFET Q2 when the driver frequency of equal to resonant frequency of the compressor.

The same result can be achieved by sensing line 18 or the drain of Q2 at the time $t_3$ and sending this signal to the microcontroller. This is represented in FIG. 7. In this case, both frequencies are very close and the back EMF is near zero at time $t_3$.

The frequency of the driver can also be adjusted by sensing the back EMF at the beginning of the stroke. At time $t_2$ MOSFET Q1 is switched on and MOSFET Q2 is switched off while MOSFETs Q3 and Q4 remain off. Time 2 represents the beginning of the new cycle or half cycle.

Figure 3:
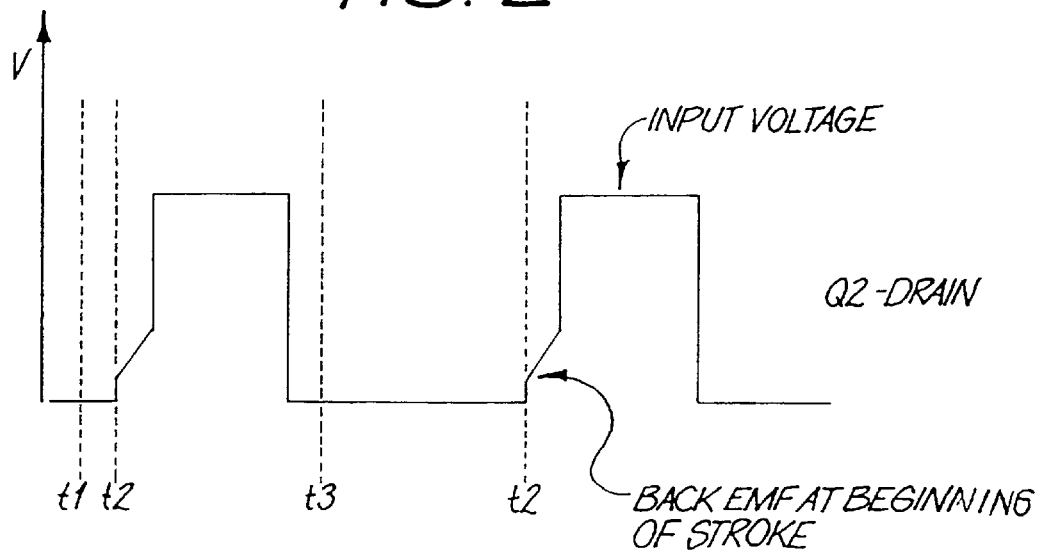
FIG. 3 is a graph of the drain voltage of MOSFET Q2 of the electrical driver shown in FIG. 1 when the driver frequency is lower than the resonant frequency of the linear compressor.

In this cycle, the compressor 11 will be powered via MOSFETs Q3 and Q1 and line 18 or the drain of MOSFET Q2 will have positive potential. If the compressor resonant frequency is higher than the driver frequency at time $t_2$ the armature will be moving in the direction of the new cycle. This means that the back EMF will produce positive potential on the drain of Q2 as can be seen in FIG. 3.

Figure 4:
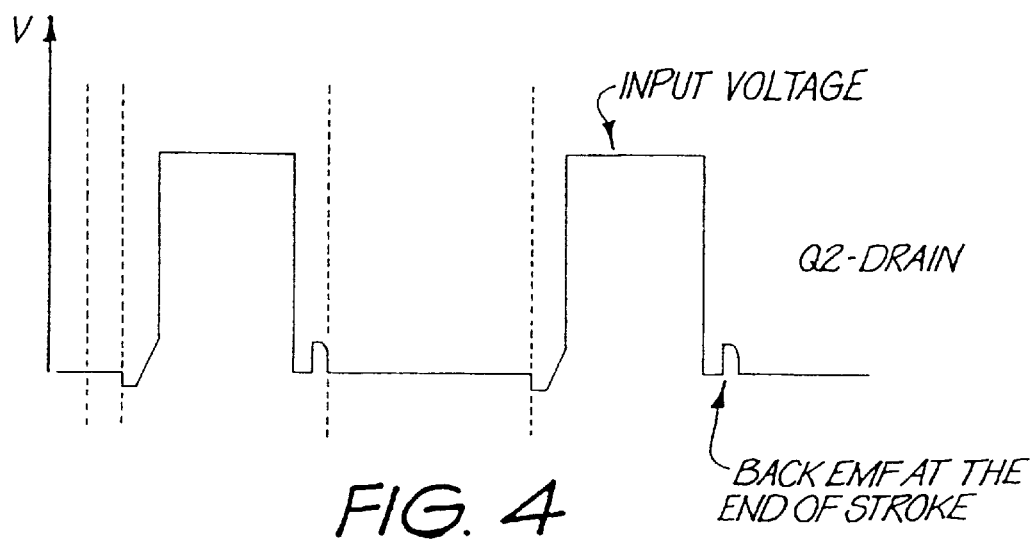
FIG. 4 is a graph of the drain voltage of MOSFET Q2 and showing back EMF sensed at the beginning of a stroke of the electrical driver shown in FIG. 1 when the driver frequency is higher than the resonant frequency of the linear compressor and showing the back EMF sensed at the end of a stroke.

If the compressor resonant frequency is lower than the driver frequency that at time $t_2$ the armature will still be moving in the previous cycle direction. Thus, the back EMF will produce negative potential on the line 18 or the drain of Q2 as shown in FIG. 4. This signal is fed to the microcontroller via resistor 22 and converted to a digital signal. As in the previous case, the microcontroller will adjust the driver frequency so that the signal on the drain of Q2 at time $t_2$ is close to zero. Ideally, this will guarantee that the driver of frequency is close to the resonant frequency of the compressor as shown in FIG. 7. The same result can be achieved by sensing the signal on the drain of Q1 at $t_3$ as is shown in FIG. 5 where the compressor frequency is lower than the driver frequency.

As will be apparent from the foregoing description, the preferred embodiment provides a symmetrical driver for a resonant type linear motor that provides a dead time with the winding of the motor being unloaded during this dead time so that the back EMF of the motor can be monitored.

Figure 8:
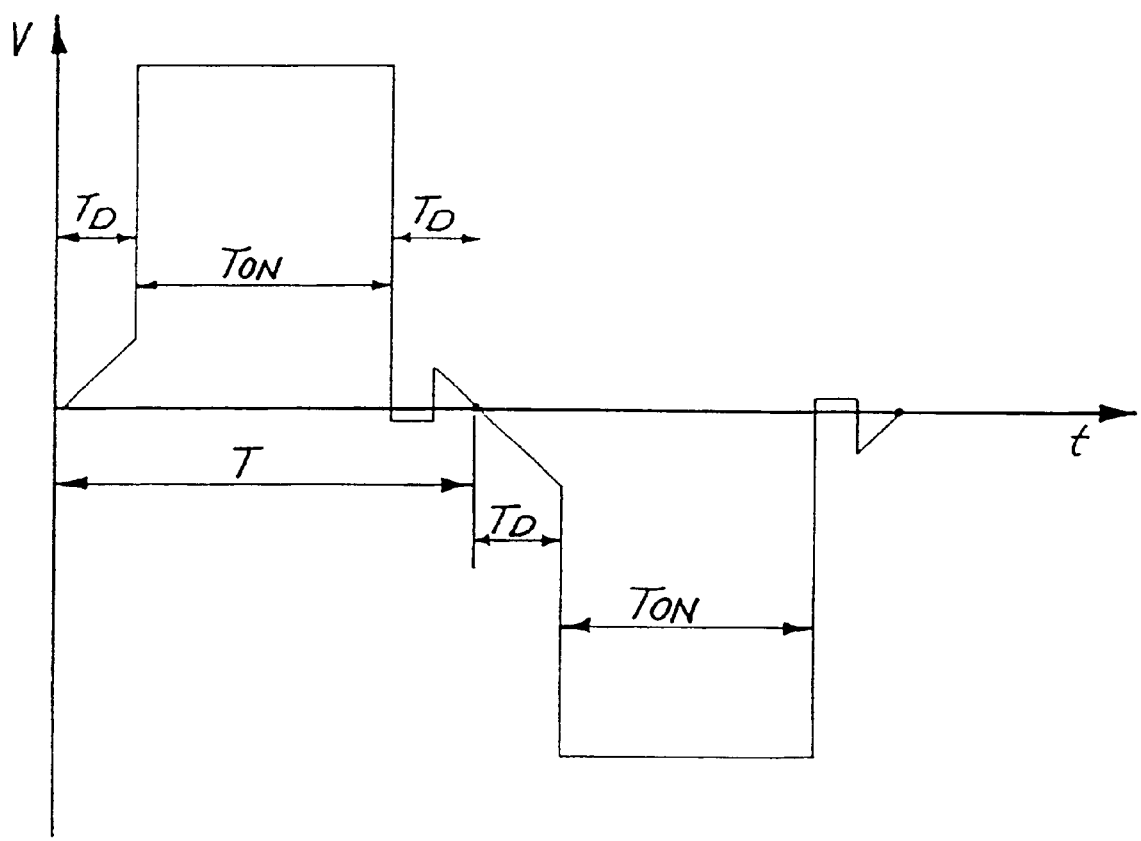
FIG. 8 is a graph of combined compressor voltage against time for one complete cycle of operation.

The combined compressor voltages are shown in FIG. 8 where:

$T_D$—DEAD TIME—NO VOLTAGE APPLIED TO COMPRESSOR SO BACK EMF CAN BE OBSERVED $T_{ON}$—ON TIME—COMPRESSOR IS POWERED BY DRIVER

T—HALF CYCLE TIME=$T_{ON}$+2TD f=FREQUENCY=½T f=RESONANT FREQUENCY OF THE COMPRESSOR IF BACK EMF IS AROUND ZERO AT TIME T

The driver frequency is adjusted so that the back EMF of the motor is near zero at the time when the driver polarity changes from one side to the other—that is to say, the armature movement is near zero at the same time which means that the armature is changing direction at close to the same time when the driver waveform changes from one side to the other i.e. the driver frequency is close to the compressor resonant frequency.

As indicated above, the magnitude of the back EMF is indicative of the degree that operating frequency is "out of phrase" with the resonant frequency. The control circuit may allow for a small amount of back EMF before corrective action is taken by the control circuit.

For example, a plus or minus 300 mW deviation may be acceptable before the driving frequency is altered. In this sense, the magnitude of 300 mW is used as a threshold.

It should be understood that the wave form which have been described above and which is shown in the drawings are the compressor drive wave forms and they can be monitored at different places in the electrical driver without departing from the scope and ambit of the invention.

Industrial Applicability

The frequency control system of the invention is applicable to a linear electrical motor which drives a linear refrigerant compressor.

What is claimed is:

1. A method of controlling the frequency of a driver circuit of a linear electrical motor which drives a linear refrigerant compressor that has a characteristic resonant frequency, said method comprising the steps of measuring the magnitude and polarity of the back EMF of the electrical motor at the start and/or the end of the stroke of the compressor, analysing the measured back EMF to determine whether the driver frequency is higher or lower than the resonant frequency of the compressor, and adjusting the frequency of the driver to or close to the resonant frequency of the compressor.

2. A method of operating the driver circuit of a linear electrical motor which drives a linear refrigerant compressor that has a characteristic resonant frequency, said method comprising monitoring the polarity of the back EMF of the electrical motor at the start and/or the end of the stroke of the compressor, analysing the monitored back EMF and adjusting the frequency of the driver to or close to the resonant frequency of the compressor.

3. A control circuit for a linear electrical motor which drives a linear refrigerant compressor that has a resonant frequency, said control circuit comprising means for measuring the magnitude and polarity of the back EMF of the electrical motor at the beginning and/or end of the stroke of the compressor, means for analysing the measured back EMF to determine whether the driver frequency is higher or lower than the resonant frequency of the compressor and means for adjusting the frequency of the driver to or close to the resonant frequency of the compressor.

4. An electrical driver for an electrically driven linear compressor having a reciprocating armature and a characteristic resonant frequency, the driver comprising:

positive and negative direct current input lines, first and second supply lines each supplying one side of the compressor, a first MOSFET located between the negative input line and the first supply line;

a second MOSFET located between the negative input and the second supply line;

a third MOSFET located between the positive input and the second supply line; and a fourth MOSFET located between the positive input and the first supply line;

a control circuit for operating the MOSFETS in pairs at a controlled frequency to achieve a reciprocating motion of the armature, which motion is driven in each direction by a different pair of MOSFETS, said control circuit comprising, means for measuring the magnitude and polarity of the back EMF of the armature, means for analysing the measured back EMF to determine whether the driver frequency is higher or lower than the resonant frequency of the compressor and means for adjusting the controlled frequency of the driver to or close to the resonant frequency of the compressor.

5. An electrical driver according to claim 4, wherein the control circuit measures the back EMF at the end of a stroke of the armature.

6. An electrical driver according to claim 4 wherein the control circuit measures the back EMF at the start of the stroke of the armature.

7. An electrical driver according to claim 4 wherein the control circuit further comprises an analogue to digital converter which operates on an analogue voltage signal carried by a sensing line connected between one of the supply lines and the control circuit to produce a digital signal which represents the back EMF and which is analysed by the control circuit.

8. An electrical driver according to claim 4 wherein the back EMF is measured by the control circuit during a dead time.

* * * * *